US011689451B1

(12) United States Patent
Schweers et al.

(10) Patent No.: US 11,689,451 B1
(45) Date of Patent: Jun. 27, 2023

(54) ROUTING NETWORKS AND METHODS USING DYNAMIC CONFIGURATION OF WEB SERVICES

(71) Applicant: QuickBase, Inc., Cambridge, MA (US)

(72) Inventors: Matthew F. Schweers, Medford, MA (US); John J. Fox, Ipswich, MA (US)

(73) Assignee: Quickbase, Inc., Boston, MA (US)

( * ) Notice: Subject to any disclaimer, the term of this patent is extended or adjusted under 35 U.S.C. 154(b) by 0 days.

(21) Appl. No.: 17/174,283

(22) Filed: Feb. 11, 2021

Related U.S. Application Data

(60) Provisional application No. 63/115,193, filed on Nov. 18, 2020.

(51) Int. Cl.
*H04L 12/28* (2006.01)
*H04L 45/44* (2022.01)

(52) U.S. Cl.
CPC .................................... *H04L 45/44* (2013.01)

(58) Field of Classification Search
CPC ....... H04L 45/44; H04L 67/142; H04L 67/34; H04L 45/70
See application file for complete search history.

(56) References Cited

U.S. PATENT DOCUMENTS 5,705,443 A 1/1998 Stauf et al.
6,076,092 A 6/2000 Goldberg et al.
6,389,429 B1 5/2002 Kane et al.
6,473,765 B1 10/2002 Fink
6,725,235 B1 4/2004 Dyer et al.
7,257,597 B1 8/2007 Pryce et al.
7,490,073 B1 2/2009 Qureshi et al.
7,647,298 B2 1/2010 Adya et al.
7,657,516 B2 2/2010 Zaman et al.
8,335,772 B1 12/2012 Ramesh et al.
8,407,255 B1 3/2013 Srivastava et al.
8,600,994 B1 12/2013 Xu et al.
9,317,557 B2 4/2016 Shao et al.
9,762,485 B2 * 9/2017 Kaplan .................. H04L 49/30
10,307,501 B2 6/2019 Dayton
10,374,953 B1 * 8/2019 Branch ............... H04L 12/4633
2003/0101035 A1 5/2003 Gabele et al.
2004/0181538 A1 9/2004 Lo et al.
2005/0154742 A1 7/2005 Roth
2005/0160104 A1 7/2005 Meera et al.
2006/0106832 A1 5/2006 Ben-Dyke et al.

(Continued)

*Primary Examiner* — Abdelnabi O Musa
(74) *Attorney, Agent, or Firm* — Davis Malm D'Agostine PC; David J. Powsner

(57) ABSTRACT

The invention provides in some aspects a routing network comprising one or more nodes, at least one of which executes a process that routes received messages—and/or the digital data packets that make them up—to downstream nodes (i.e., further routing nodes or terminal nodes, within or outside or off the network) based on directives maintained in a routing table or other store ("routing table") local to or otherwise associated with the receiving node. That node is responsive to interrupts or other notifications received from a control module with which it is in communications coupling for updating those directives with information supplied with that notification or otherwise available in connection therewith. As subsequent messages are received by the node, the process routes them to downstream nodes based on those updated directives.

13 Claims, 3 Drawing Sheets

(56) References Cited

U.S. PATENT DOCUMENTS

| | | | | |
|---|---|---|---|---|
| 2007/0050323 | A1 | 3/2007 | Dettinger et al. | |
| 2007/0162274 | A1 | 7/2007 | Ruiz et al. | |
| 2007/0226203 | A1 | 9/2007 | Adya et al. | |
| 2010/0169380 | A1 | 7/2010 | Miller et al. | |
| 2011/0276695 | A1* | 11/2011 | Maldaner | G06F 9/5083 709/226 |
| 2011/0307501 | A1 | 12/2011 | Terwilliger et al. | |
| 2012/0246179 | A1 | 9/2012 | Garza et al. | |
| 2015/0156127 | A1* | 6/2015 | Bello | H04L 45/02 370/235 |
| 2017/0346709 | A1* | 11/2017 | Menon | H04L 45/70 |
| 2018/0189397 | A1* | 7/2018 | Norman | G06F 16/2423 |
| 2018/0254947 | A1* | 9/2018 | Baj | H04L 41/0893 |
| 2019/0253341 | A1* | 8/2019 | Timmons | H04L 67/141 |

* cited by examiner

ROUTING NETWORKS AND METHODS USING DYNAMIC CONFIGURATION OF WEB SERVICES

BACKGROUND OF THE INVENTION

This application claims the benefit of priority of U.S. Patent Application Ser. No. 63/115,193, filed Nov. 18, 2020, and entitled DYNAMIC CONFIGURATION OF WEB SERVICES, the teachings of which are incorporated herein by reference.

The invention pertains to digital data networking and, more particularly, to routing networks for transmitting digital data messages between and among network nodes. The invention has application in improving the utility of such networks.

Though laypeople typically think of digital data networks as simple cables that carry information directly between client and server computers, the actual architecture is considerably more complex. Networks are usually comprised of multiple interconnected nodes that can be enlisted in varying sequences and at varying times to carry information-containing data packets and the messages that they form over varying paths from sources (e.g., client computers) to destinations (e.g., server computers) and vice versa. This is out of necessity and convenience. Necessity, for example, in the sense that nodes and the paths between them can break or become overburdened, necessitating the use of alternate nodes and paths from source to destination. Convenience, for example, in the sense that sources and destinations can, themselves, take roles as nodes in routing packets and/or messages between still other nodes of the network.

Such networks (or "routing networks" as they are sometimes referred to hereinafter) exist at many levels, for example, within the home or enterprise, within a campus or other geographic region, and at a national/public level, such as the Internet—all, by way of example. Moreover, they can be (and, indeed, typically are) interconnected, e.g., by gateways or the like. Packet routing decisions within nodes of a routing network are typically controlled by a table—i.e., a "routing table"—that identifies downstream nodes to which to send newly received packets, e.g., based on IP addresses. Those tables can be static in the sense that routing information with which they are loaded upon initialization of the routing device remains fixed until re-initialization. Or, they can be dynamic in the sense that routing information can be automatically updated based on signaling received from downstream nodes of congestion and/or breakage. While that latter would seem a vast improvement over static tables, dynamic routing tables nonetheless starve the network administrator of control without providing critical flexibility.

An object of the invention is to provide improved methods and apparatus for digital data networking.

A further object is to provide such methods and apparatus for digital data networking as improve the transmission of digital packets and/or messages between and among nodes from sources to destinations.

A still further object of the invention is to provide such methods and apparatus as improve control over routing networks while, at the same time, improving network flexibility.

SUMMARY OF THE INVENTION

The aforementioned are among the objects attained by the invention which provides in some aspects a routing network comprising one or more nodes, at least one of which executes a process that routes received messages and/or the digital data packets that make them up (collectively, "messages") to downstream nodes (i.e., further routing nodes or terminal nodes, within or outside or off the network) based on directives maintained in a routing table or other store ("routing table") local to or otherwise associated with the receiving node. That node is responsive to interrupts or other notifications received from a control module with which it is in communications coupling for updating those directives with information supplied with that notification or otherwise available in connection therewith. When subsequent messages are received by the node, the process routes them to downstream nodes based on those updated directives. Related aspects of the invention provide a routing network, e.g., of the type described above, comprising a plurality of routing nodes executing on multiple digital data processing devices that are coupled for communications.

Further related aspects of the invention provide a routing network, e.g., as described above, in which the multiple digital data processing devices reside behind a common gateway.

Still further related aspects of the invention provide a routing network, e.g., as described above, in which the control module executes on a digital data processing device different from that on which at least one of the routing nodes executes.

Other aspects of the invention provide a routing network, e.g., as described above, in which one or more of the routing nodes are implemented as web services.

Related aspects of the invention provide a routing network, e.g., as described above, in which at least one of the web services relies on a service context associated with the process within which that web service executes, which service context initializes programming constructs, data structures, and the like, necessary for operation of the respective web service during the lifetime of the process in which it executes.

Further related aspects of the invention provide a routing network, e.g., as described above, in which the routing table associated with a routing node is implemented in a context other than the service context of the corresponding web service.

Still other related aspects of the invention provide a routing network, e.g., as described above, in which at least one of the routing tables includes code for modifying and/or supplementing message headers and/or downstream node addresses of messages routed by the routing node with which that routing table is associated.

Other aspects of the invention provide methods of operating a routing network paralleling operations of the digital data network described above.

Still further aspects of the invention are evident in the text that follows and in the drawings.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Figure 1:
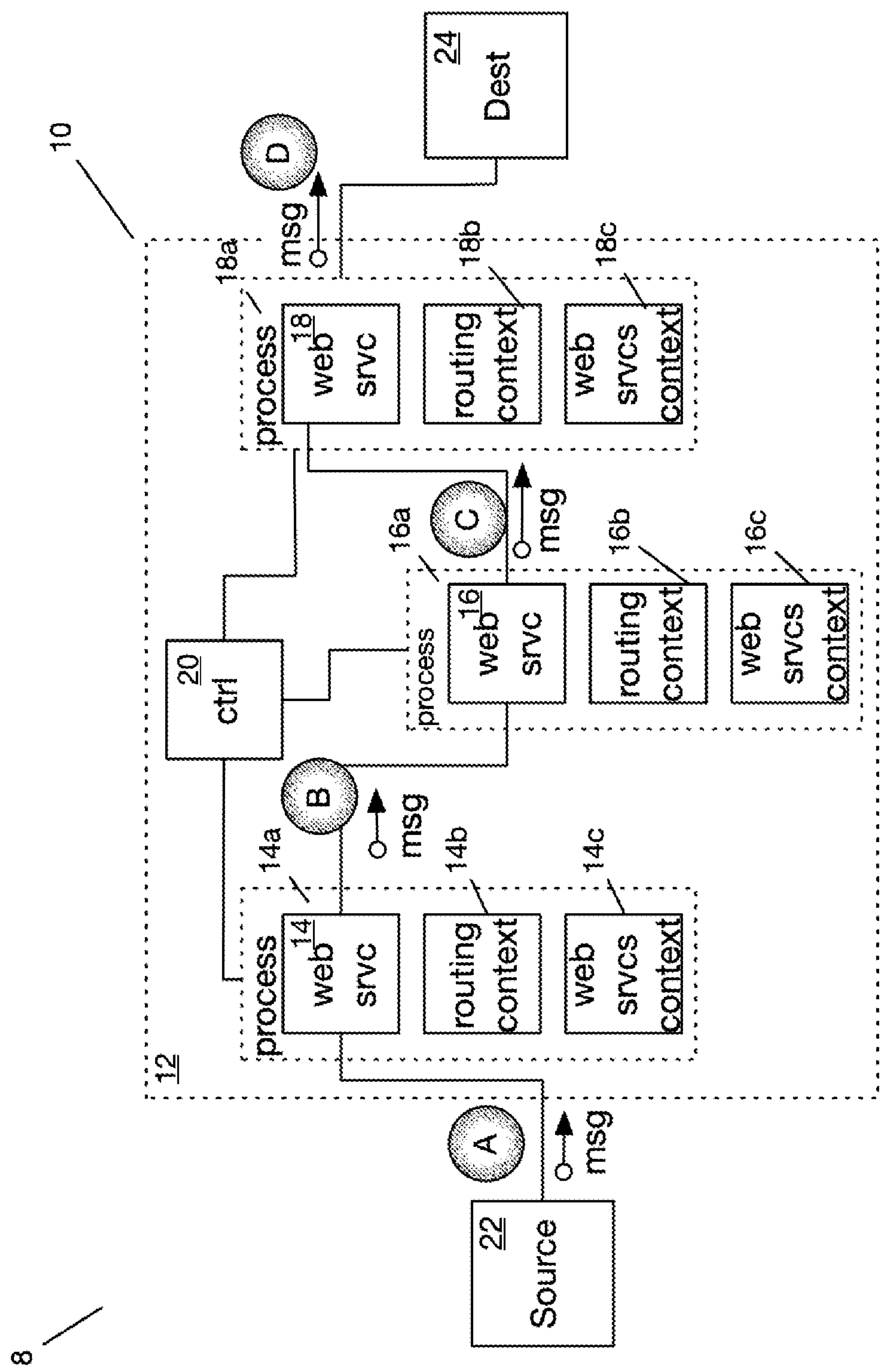
FIG. 1 depicts a digital data processing system including a routing network and labels for a first set of steps of its operation according to the invention.
Figure 2:
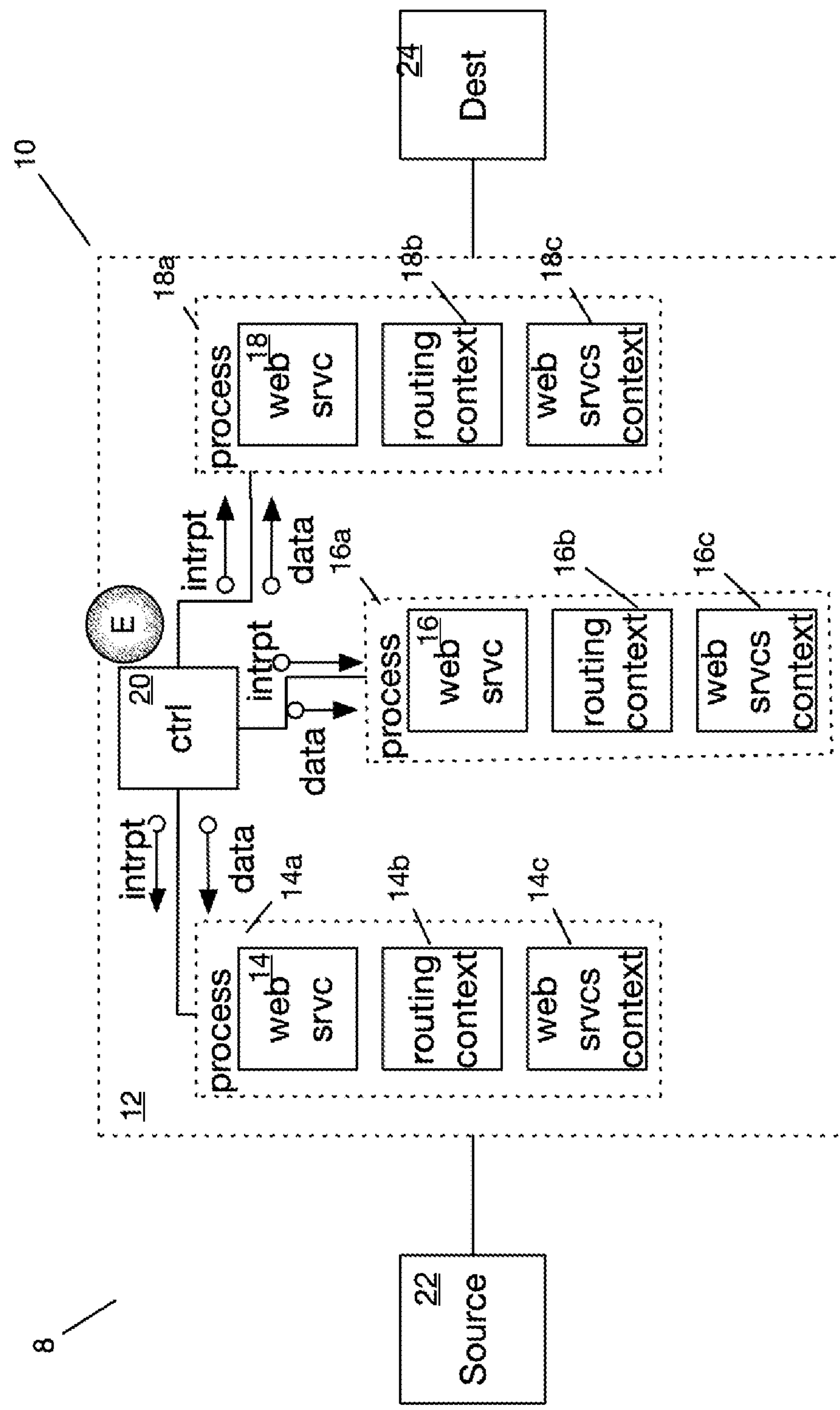
FIG. 2 depicts a digital data processing system including a routing network and labels for a second set of steps of its operation according to the invention.
Figure 3:
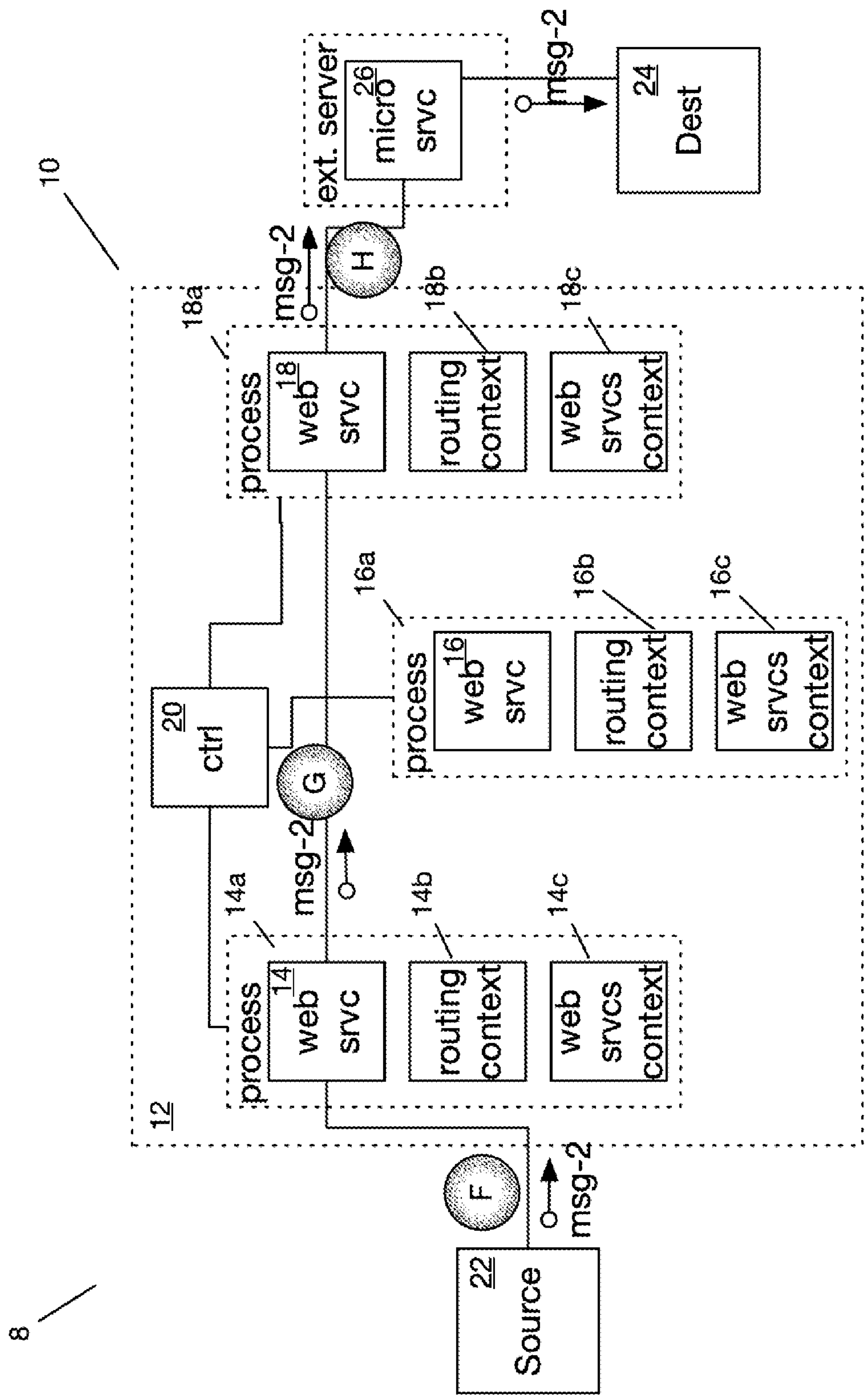
FIG. 3 depicts a digital data processing system including a routing network and labels for a third set of steps of its operation according to the invention.

The architecture of a networked digital data processing system 8 utilizing dynamic configuration of web services according to the invention is depicted in FIGS. 1-3. Here, that technology is put to use in configuring a routing network 10, though, in other embodiments the technology can be used to configure web services for other purposes.

The routing network 10 includes a plurality of software modules 14, 16, 18 executing as web services within respective processes 14*a*, 16*a*, 18*a* that additionally maintain routing contexts 14*b*. 16*b*, 18*b* and service contexts 14*c*, 16*c*, 18*c* for the web service modules 14, 16, 18. The processes 14*a*, 16*a*, 18*a* of the illustrated embodiment execute on a single digital data processing device 12 of the type including a processor and memory; however, in other embodiments, they may execute on multiple such devices that are networked and that are co-housed in a common facility (e.g., a server farm) and/or reside behind a common gateway that separates them from other networks. Control and coordination of the processes 14*a*-18*a* is provided via software module 20 implemented in a supervisory or other process executing on data processor(s) 12 to effect the operations described below.

In the illustrated embodiment, nodes defined by web services 14, 16, 18, respectively, function to route messages and/or the packets that make them up from a source 22 to a destination 24. The source and destination comprise conventional digital data devices of the variety known in the art and/or apps, processes, etc., executing thereon, all as is within the ken of those skilled in the art. Source 22 and destination 24 need not be aware that the messages routed between them may travel on a routing network architected and operated in accord with the teachings hereof. In the discussion that follows, messages and/or their constituent packets are collectively referred to herein after as "messages," except where otherwise evident from context.

Implementation of web services 14, 16, 18 (and the respective processes 14*a*, 16*a*, 18*a* in which they execute) to serve as nodes within a routing network is with the ken of those skilled art in view of the teachings hereof. Thus, for example, each of those web services 14, 16, 18 (and, more generally, the processes 14*a*, 16*a*, 18*a* of which they form a part) relies on its respective service context 14*c*, 16*c*, 18*c* to initialize programming constructs, data structures, and the like, necessary for operation of those services 14, 16, 18 during their respective lifetimes (e.g., until machine 12 and/or the respective processes 14*a*, 16*a*, 18*a* are shut down).

Per convention, the data structures initialized by the service contexts 14*c*, 16*c*, 18*c* and used throughout the lifetimes of the respective services 14, 16, 18 would include information (i.e., "routing directives") specifying where and how messages passed to (and received by) each service 14, 16, 18 are to be routed. However, the illustrated network 10 varies from that convention. Instead, the web services 14, 16, 18 rely on data maintained in routing tables or other stores (collectively, "routing tables") in respective routing contexts 14*b*, 16*b*, 18*b* local to those nodes for those routing directives. Those contexts 14*b*, 16*b*, 18*b*—and, specifically, the routing information contained in them—are initialized at launch of the respective processes 14*a*, 16*a*, 18*a* and updated throughout the lifetimes of those processes with data provided by the control module 20. Likewise, the web services 14, 16, 18 access the routing information in those contexts 14*b*, 16*b*, 18*b* throughout the respective lifetimes of the services 14, 16, 18 so that any changes to that routing information can be put to immediate use with newly received messages.

Processes 14*a*, 16*a*, 18*a* of the illustrated embodiment are responsive to interrupts or other notifications (collectively, "notifications") received from the control module 20 to update routing data information in the respective contexts 14*b*, 16*b*, 18*b* with information supplied with that notification or otherwise available in connection therewith. In some embodiments, the aforesaid routing data maintained within each context 14*b*, 16*b*, 18*b* is limited to a single respective local and/or remote address of the downstream nodes to which messages incoming to each respective web service 14, 16, 18 is to be routed. In other embodiments, that data includes multiple respective addresses and code (or metadata) specifying downstream addresses for incoming message of particular types. In these and still other embodiments, the data can include code for modifying and/or supplementing message headers and/or downstream node addresses or otherwise in accord with message types or otherwise.

Implementation of the processes 14*a*, 16*a*, 18*a* and their constituent web services 14, 16, 18 and contexts 14*b*, 14*c*, 16*b*, 16*c*, 18*b*, 18*c* to effect the foregoing—as more particularly realized, by way of non-limiting example, in the steps discussed below—is within the ken of those skilled in the art in view of the teachings hereof.

Step A: Source 22 transmits a message ("msg") for routing to destination 24 via routing network 10. Msg is of a conventional variety known in the art suitable for routing via web services, whether implemented on public or private networks, or otherwise. The message msg is received at the node of routing network 10 effected via web service 14 (a/k/a "node 14").

Step B: Based on routing information with which its respective routing context 14*b* was initialized (e.g., by control module 20), web service 14 directs msg to a downstream node specified by that context 14*b*—here, in the example, a further node of the routing network 10, to wit, the node effected by web service 16 (a/k/a "node 16"). In the illustrated embodiment, such direction is effected by modifying the header of msg, though, other embodiments may vary in this regard.

Step C: Based on routing information with which its respective routing context 16*b* was initialized (e.g., by control module 20), web service 16 directs msg to a downstream node specified by that context 16*b*—here, in the example, a further node of the routing network 10, to wit, the node of routing network 10 effected by web service 18 (a/k/a "node 18"). In the illustrated embodiment, such direction is effected by modifying the header of msg, though, other embodiments may vary in this regard.

Step D: Based on routing information with which its respective routing context 18*b* was initialized (e.g., by control module 20), web service 18 directs msg to a downstream node specified by that context 18*b*. Here, in the example, that downstream node resides outside the network 10 and web service 18 accordingly launches msg onto public or private networks to which it is coupled for routing to destination 24 in the conventional manner known in the art.

Step E: control module 20 sends interrupts (or other notifications) and routing data to processes 14, 16, 18 to change their routing contexts 14b, 16b, 18b. As will be evident in the text below, in the example that follows, the updates are to effectively remove node 16 from the routing network and to cause node 18 to route all messages, e.g., msg-2 in the example, to an external node that implements a web micro-service—as opposed to routing them directly to the destination 24.

Step F: Source 22 transmits a new message ("msg-2") for routing to destination 24 via routing network 10. As above, msg-2 is of a conventional variety known in the art suitable for routing via web services, whether implemented on public or private network, or otherwise. The message msg-2 is received at node 14, as shown.

Step G: Based on routing information received by its respective routing context 14b in step E, web service/node 14 directs msg-2 to the downstream node specified by that context 14b—here, in the example, a further node of the routing network 10, to wit, node 18. As above, this can be effected via header modification or otherwise.

Step H: Based on routing information received by its respective routing context 18b in step E, web service/node 18 directs msg-2 to the downstream node specified by that context 18b—here, an external node implementing a micro-service 26. Code provided by context 18b (and supplied to it in Step E by control module 20) can be used to modify msg-2 headers to include suffixes required by the micro-service 26 API.

Step I: Micro-service 26 routes msg-2 to destination 24 per convention in the art. Described above is a networked digital data processing system 8 utilizing a routing network 10 according to some practices of the invention. It will be appreciated that the illustrated embodiment shows but one embodiment of the invention and that other embodiments incorporating changes therein fall within the scope of the invention.

In view of the foregoing, what is claimed is:

1. A routing network comprising:

one or more routing nodes executing on one or more digital data processors, each of a type that include a processor and memory, at least one of the routing nodes executing a process that routes received messages and/or the digital data packets that make them up to downstream nodes, a control module executing on one or more of said digital data processors and in communications coupling with the at least one routing node, where the at least one routing node (i) is implemented as a web service, (ii) performs such routing based on directives maintained in a routing table or other store (collectively, "routing table") local to or otherwise associated with the receiving routing node, (iii) responds to interrupts or other notifications received from the control module by updating those directives with information supplied with that notification or otherwise available in connection therewith, (iv) performs such routing of subsequently received messages and/or the digital data packets that make them up based on those updated directives (v) modifies at least one of a message header and/or downstream node address of the received message and/or the digital data packets that make it up based on information in the routing table in order to effect routing of the received message and/or the digital data packets that make it up to a said downstream node and/or processing of the message thereby.

2. The routing network of claim 1, comprising plural said routing nodes, where the plural routing nodes execute on multiple digital data processing devices that are coupled for communications.

3. The routing network of claim 2, wherein the multiple digital data processing devices reside behind a common gateway.

4. The routing network of claim 2, in which the control module executes on a digital data processing device different from that on which at least one of the routing nodes executes.

5. The routing network of claim 1, in which at least one of the web services relies on a service context associated with the process within which that web service executes, which service context initializes at least programming constructs and/or data structures necessary for operation of the respective web service during the lifetime of the process in which it executes.

6. The routing network of claim 5, in which the routing table associated with a said routing node is implemented in a context other than the service context of the corresponding web service.

7. The routing network 1, in which at least one of the routing tables includes code for modifying and/or supplementing message headers and/or downstream node addresses of messages and/or the digital data packets that make them up routed by the routing node with which that routing table is associated.

8. A method of operating a routing network comprising:

executing a process on at least one routing node of the routing network to route received messages and/or the digital data packets that make them up to downstream nodes, wherein the at least one routing node is implemented as a web service, effecting such routing based on directives maintained in a routing table or other store (collectively, "routing table") local to or otherwise associated with the receiving node and modifying at least one of a message header and/or downstream node address of the received message and/or the digital data packets that make it up based on information in the routing table in order to effect routing of the received message and/or the digital data packets that make it up to a said downstream node and/or processing of the message thereby, responding to interrupts or other notifications received from a control module for updating those directives with information supplied with that notification or otherwise available in connection therewith, effecting such routing of a subsequently received message and/or the digital data packets that make it up based on those updated directives and modifying at least one of a message header and/or downstream node address of the subsequently received message and/or the digital data packets that make it up based on information in the routing table in order to effect routing of the subsequently received message and/or the digital data packets that make it up to a said downstream node and/or processing of that message thereby.

9. The method of claim 8, comprising executing such process on multiple digital data processing devices that are coupled for communications.

10. The method of claim 9, wherein the multiple digital data processing devices reside behind a common gateway.

11. The method of claim 9, comprising executing the control module on a digital data processing device different from that on which at least one of the routing nodes executes.

12. The method of claim 8 comprising initializing, with a service context associated with the process within which a said web service executes, at least one of programming constructs and/or data structures necessary for operation of the respective web service during the lifetime of the process in which it executes.

13. The method of claim 12, comprising implementing the routing table associated with routing node in a context other than the service context of the corresponding web service.

* * * * *